US012682903B2

(12) United States Patent
Sharifi et al.

(10) Patent No.: US 12,682,903 B2
(45) Date of Patent: Jul. 14, 2026

(54) VOICE QUERY QoS BASED ON CLIENT-COMPUTED CONTENT METADATA

(71) Applicant: Google LLC, Mountain View, CA (US)

(72) Inventors: Matthew Sharifi, Kilchberg (CH); Aleksandar Kracun, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/480,798

(22) Filed: Oct. 4, 2023

(65) Prior Publication Data

US 2024/0029740 A1 Jan. 25, 2024

Related U.S. Application Data

(63) Continuation of application No. 17/661,625, filed on May 2, 2022, now abandoned, which is a continuation (Continued)

(51) Int. Cl.
*G10L 15/30* (2013.01)
*G06F 16/63* (2019.01)
(Continued)

(52) U.S. Cl.
CPC .............. *G10L 15/30* (2013.01); *G06F 16/63* (2019.01); *G10L 15/08* (2013.01); *G10L 15/22* (2013.01);
(Continued)

(58) Field of Classification Search
None
See application file for complete search history.

(56) References Cited

U.S. PATENT DOCUMENTS 6,366,882 B1 4/2002 Bijl et al.
9,401,140 B1 * 7/2016 Weber ..................... G10L 15/07
(Continued)

FOREIGN PATENT DOCUMENTS

JP 2016-004270 A 1/2016
JP 2022-519648 A 3/2022

OTHER PUBLICATIONS

International Search Report and Written Opinion for the PCT Application No. PCT/US2019/016882 dated Oct. 10, 2019.
(Continued)

*Primary Examiner* — Richemond Dorvil
*Assistant Examiner* — Alexander G Marlow
(74) *Attorney, Agent, or Firm* — Honigman LLP; Brett A. Krueger; Grant Griffith

(57) ABSTRACT

A method includes receiving an automated speech recognition (ASR) request from a user device that includes a speech input captured by the user device and content metadata associated with the speech input. The content metadata is generated by the user device. The method also includes determining a priority score for the ASR request based on the content metadata associated with the speech input and caching the ASR request in a pre-processing backlog of pending ASR requests each having a corresponding priority score. The pending ASR requests in the pre-processing backlog are ranked in order of the priority scores. The method also includes providing, from the pre-processing backlog, one or more of the pending ASR requests to a backend-side ASR module, wherein pending ASR requests associated with higher priority scores are processed before pending ASR requests associated with lower priority scores.

20 Claims, 9 Drawing Sheets

Related U.S. Application Data of application No. 17/310,175, filed as application No. PCT/US2019/016882 on Feb. 6, 2019.

(51) Int. Cl.

| | |
|---|---|
| *G10L 15/08* | (2006.01) |
| *G10L 15/22* | (2006.01) |
| *H04L 67/568* | (2022.01) |

(52) U.S. Cl.
CPC ...... *H04L 67/568* (2022.05); *G10L 2015/088* (2013.01)

(56) References Cited

U.S. PATENT DOCUMENTS

| | | | |
|---|---|---|---|
| 10,504,504 B1 | 12/2019 | Meltzner et al. | |
| 10,699,706 B1 | 6/2020 | Jayavel et al. | |
| 10,748,529 B1 * | 8/2020 | Milden .................. | G10L 15/22 |
| 2009/0052636 A1 | 2/2009 | Webb et al. | |
| 2010/0010823 A1 | 1/2010 | Scipioni et al. | |
| 2013/0151250 A1 | 6/2013 | VanBlon | |
| 2014/0214429 A1 | 7/2014 | Pantel | |
| 2015/0331490 A1 | 11/2015 | Yamada | |
| 2015/0348548 A1 | 12/2015 | Piernot et al. | |
| 2016/0005394 A1 | 1/2016 | Hiroe | |
| 2016/0026627 A1 | 1/2016 | Johnston et al. | |
| 2016/0098992 A1 | 4/2016 | Renard et al. | |
| 2016/0240194 A1 | 8/2016 | Lee et al. | |
| 2017/0083285 A1 | 3/2017 | Meyers et al. | |
| 2017/0243577 A1 * | 8/2017 | Wingate .................. | G10L 15/22 |
| 2018/0308472 A1 | 10/2018 | Lopez Moreno et al. | |
| 2018/0330728 A1 | 11/2018 | Gruenstein et al. | |
| 2019/0139541 A1 * | 5/2019 | Andersen ................ | G10L 25/48 |
| 2019/0213278 A1 * | 7/2019 | Min ........................ | G10L 25/54 |
| 2019/0214002 A1 | 7/2019 | Park et al. | |
| 2019/0268465 A1 | 8/2019 | Broidy et al. | |
| 2019/0369748 A1 * | 12/2019 | Hindi ...................... | G10L 15/22 |
| 2020/0034551 A1 | 1/2020 | Cantrell et al. | |
| 2020/0184959 A1 * | 6/2020 | Yasa ..................... | G06F 16/334 |
| 2020/0184966 A1 * | 6/2020 | Yavagal ................. | G10L 15/30 |
| 2020/0184967 A1 * | 6/2020 | Gupta ................... | B60K 35/00 |
| 2020/0193982 A1 | 6/2020 | Kim | |
| 2020/0243094 A1 | 7/2020 | Thomson et al. | |

OTHER PUBLICATIONS

Intellectual Property India, Examination Report for application 202127030937, dated Mar. 7, 2022.

European Search Report for the related Application No. 22215558. 2, dated Apr. 4, 2023, 10 pages.

Office Action issued in related Japanese Patent Application No. 2024-062090, dated May 27, 2025.

* cited by examiner

1. Generate Content Metadata 110 associated with speech input 104

2. Determine whether a query processing stack 700a is overloaded

3. Execute on-device processing instructions 420 when high load condition exists.

200

104

Speech Input

Local Query Processing Stack 700b

ASR Request History 250

Sources 220

Signal Generator 220

204

206

400

Notification 410

On-device processing Instructions 420

300

QoS Manager

Overload Condition

Query Processing Stack 700a

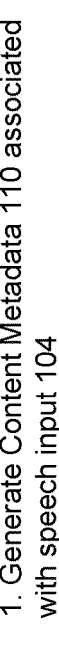

FIG. 4

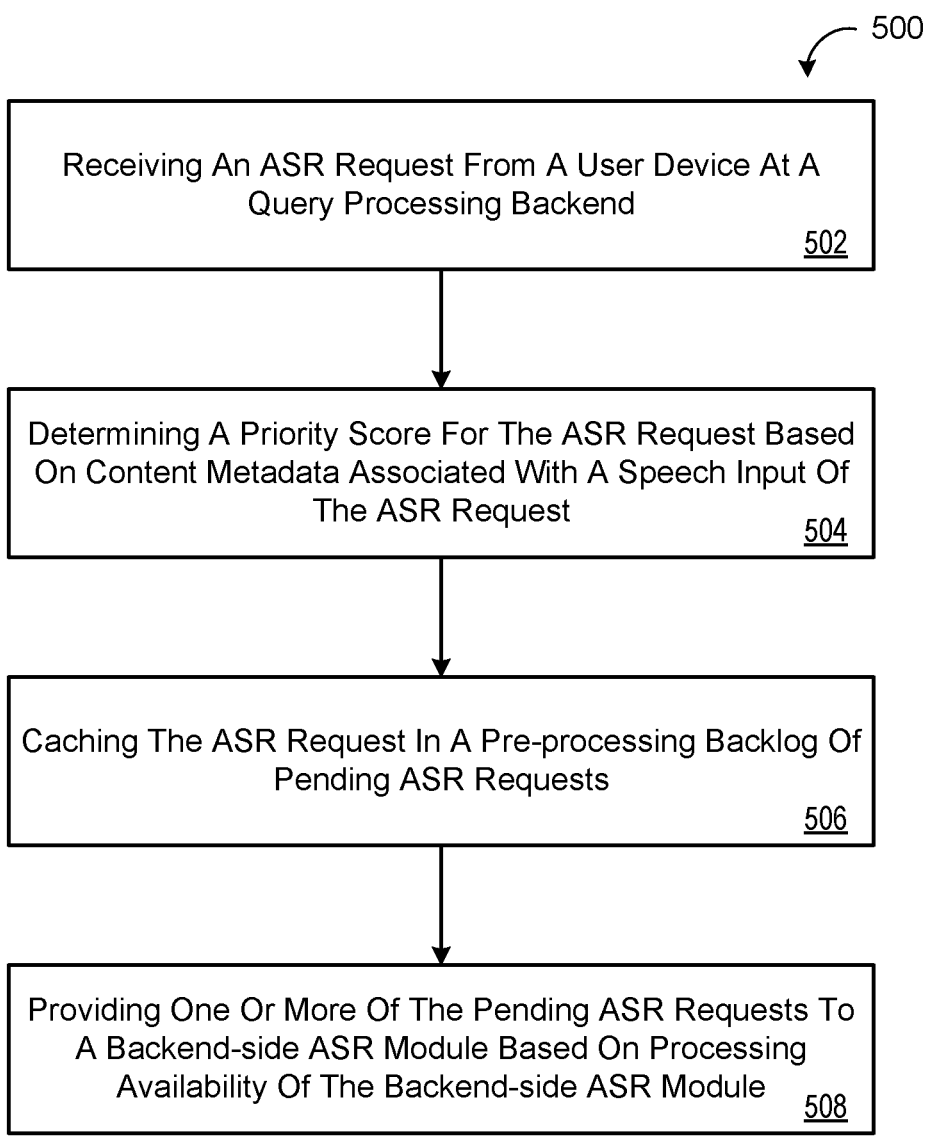

Receiving An ASR Request From A User Device At A
Query Processing Backend

502

Determining A Priority Score For The ASR Request Based
On Content Metadata Associated With A Speech Input Of
The ASR Request

504

Caching The ASR Request In A Pre-processing Backlog Of
Pending ASR Requests

506

Providing One Or More Of The Pending ASR Requests To
A Backend-side ASR Module Based On Processing
Availability Of The Backend-side ASR Module

Generating An ASR Request At A User Device

602

Receiving On-device Processing Instructions From Server-side Query Processing Stack

604

Determining Whether Server-based Query Processing Stack Is Overloaded

606

Executing The On-device Processing Instructions When The Server-based Query Processing Stack Is Overloaded

608

VOICE QUERY QoS BASED ON CLIENT-COMPUTED CONTENT METADATA

CROSS REFERENCE TO RELATED APPLICATIONS

This U.S. patent application is a continuation of, and claims priority under 35 U.S.C. § 120 from, U.S. patent application Ser. No. 17/661,625, filed on May 2, 2022, which is a continuation of U.S. patent application Ser. No. 17/310,175, filed on Jul. 23, 2021, which is a national phase application of, and claims priority under 35 U.S.C. § 371 from, international Application PCT/US2019/016882, filed on Feb. 6, 2019. The disclosures of these prior applications are considered part of the disclosure of this application and are hereby incorporated by reference in their entireties.

TECHNICAL FIELD

This disclosure relates to voice query quality of service (QoS) based on client-computed content metadata.

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. These devices may use hotwords to help discern when a given utterance is directed at the system, as opposed to an utterance that is directed to another individual present in the environment. Accordingly, the devices may operate in a sleep state or a hibernation state and wake-up only when a detected utterance includes a hotword. The query processing, which occurs at a backend server, is expensive and the server may become overloaded with more queries than it can handle at a given time. For instance, hotwords present in television programming/commercials during large events can cause the server to become over-loaded resulting in an outage.

SUMMARY

A voice enabled device (e.g., a user device executing a voice assistant) allows a user to speak a query or a command out loud and field and answer the query and/or perform a function based on the command. Through the use of a "hotword" (also referred to as a "keyword", "attention word", "wake-up phrase/word", "trigger phrase", or "voice action initiation command"), in which by agreement a predetermined term/phrase that is spoken to invoke attention for the voice enabled device is reserved, the voice enabled device is able to discern between utterances directed to the system (i.e., to initiate a wake-up process for processing one or more terms following the hotword in the utterance) and utterances directed to an individual in the environment. Typically, the voice enabled device operates in a sleep state, or a low power state, to conserve battery power and processes input audio data to detect a spoken hotword. For instance, while in the low power state, the voice enabled device captures input audio via a microphone and uses a hotword detector trained to detect the presence of the hotword in the input audio. When the hotword is detected in the input audio, the voice enabled device initiates a wake-up process for processing the hotword and/or any other terms in the input audio following the hotword.

Typically, after a voice enabled device wakes up by detecting the presence of the hotword in an utterance of speech (e.g., input audio), the voice enabled device sends the hotword and one or more other terms following the hotword over a network to a server-based processing stack (also referred to as a query processing backend) that includes at least an automated speech recognizer (ASR) configured to process the hotword and/or any other terms following the hotword. Here, the ASR may treat the received audio as an ASR request and transcribe the hotword and/or other terms following the hotword into corresponding text. The text may be provided to an interpretation layer to determine a voice query specified by the input audio and provide the query to an appropriate component to perform an action related to the query. Accordingly, when a user of a voice enabled device utters the following speech: "Hey Google, what restaurants are still open right now?", the voice enabled device may wake-up in response to detecting a hotword ("Hey Google"), and provide the terms following the hotword that correspond to a voice query ("what nearby restaurants are still open right now?") to the server-based processing stack for processing. In this example, the ASR of the server-based processing stack would transcribe the voice query into corresponding text, the interpretation layer would determine that a search for hours of operation of nearby restaurants is needed, and a search engine would obtain a list of search results containing nearby restaurants that are currently open. The search results could be provided back to the voice enabled device for display or audible output. In some scenarios, the server-based processing stack also includes a text-to-speech (TTS) converter configured to convert the list of search results into synthesized speech that is provided back to the voice enabled device for audible output thereon.

The server-based processing stack is configured to process voice queries received from a plurality of voice enabled devices associated with an entire user population. This could include millions of voice enabled devices sending voice queries for processing by the server-based processing stack. Processing voice queries is an expensive task, and in some situations, the server-based processing stack becomes over-loaded with too many voice queries than it can process at a given time. For instance, when hotwords, or other terms that sound similar hotwords, are present in large television programming events (e.g., a commercial during the Super-bowl), nearby voice enabled devices (e.g., in proximity to a television in a household) may detect the hotword and issue an un-intended voice query to the server-based processing stack, thereby resulting in a very large spike in traffic at the server-based processing stack. While it is conceivable for the server-based processing stack to simply drop voice queries that are not initiated by a real user and/or not time critical, it is difficult to identify such queries without starting the expensive processing.

Implementations herein are directed toward a query processing backend (e.g., server-based processing stack) that receives ASR requests from voice enabled devices (e.g., user devices). In addition to each ASR request including a corresponding speech input captured by the user device that includes a voice query for processing, each ASR request also includes content metadata associated with the speech input that is generated by the voice enabled device. Based on the content metadata associated with the speech input, the query processing backend is able to determine a priority score for each ASR request and cache the ASR request in a pre-processing backlog of pending ASR requests each having a corresponding priority score and ranked in order of the priority scores. Thereafter, the query processing backend may provide one or more pending ASR requests from the pre-processing backlog to a backend-side ASR module (or other component of the query processing backend) based on processing availability of the backend-side ASR module. Here, rather than the backend-side ASR module becoming overloaded during traffic spikes by attempting to process each pending ASR requests on a first-come first-serve basis, the ASR requests are prioritized such that the backend-side ASR module processes pending ASR requests associated with higher priority scores before processing pending ASR requests associated with lower priority scores. As new ASR requests come in, the pending ASR requests in the pre-processing back-log are re-ordered based on the priority scores. Ideally, those ASR requests associated with un-intended voice queries that are unlikely initiated by real users and/or not time critical, are assigned lower priority scores. As such, the ASR requests associated with lower priority scores remain in the pre-processing backlog during traffic spikes so that the backend-ASR module will first process ASR requests associated higher priority scores.

In some examples, priority scores below some threshold may simply result in the corresponding ASR request being dropped. A low priority score determined from the content metadata may also be a strong indicator that processing of the corresponding ASR request will be unsuccessful. For instance, content metadata may indicate a quality of the audio associated with the speech input is very poor, and thus, poor audio quality can provide indication that it will be difficult for the backend-ASR module to successfully transcribe the audio data into corresponding text. At the same time, poor audio quality associated with speech captured by the voice enabled device may also indicate that a user that spoke the hotword (or similar sounding word) is not in close proximity to the voice enabled device, and thus, likely did not intend to provide a speech input to the voice enabled device. The content metadata could also indicate whether or not the speech input was likely spoken by a user associated with the voice enabled device. For instance, a hotword detector on the voice enabled device may compare the speech input to an audio profile for that user and determine whether or not the speech input was more than likely spoken by that user. When the content metadata does indicate that the user did likely speak the speech input, the corresponding ASR request may be assigned a higher priority score than if a different user spoke the speech input. On the other hand, when the content metadata indicates that a different user or broadcast audio from an audio broadcast device (e.g., TV, music speaker, or other non-human source capable of outputting acoustic sounds) initiated the speech input, the corresponding ASR request may be assigned a low priority score. The content metadata can include any type of data computed/generated by the voice enabled device and included in the ASR request provided to the query processing backend so that the query processing backend can prioritize the importance of the ASR request without incurring any processing (or at least very limited amount of processing) on the ASR request. In view of the foregoing, the content metadata associated with the speech input represents a likelihood that the corresponding ASR request will be successfully processed by the backend-side ASR module and/or a likelihood that processing of the corresponding ASR request will have an impact on the user associated with the voice enabled device.

Speech processing in home devices often occurs at the server and at peak times which can create a large backlog of requests for speech processing. Some of these requests may be genuine requests whereas some may be the result of broadcast audio (e.g., audio output from non-human sources such as televisions, radios, or synthesized speech). It is an object of the invention to provide a method to improve the processing of a large volume of speech recognition requests. By prioritizing the requests it allows the speech recognition module to process the more important or urgent requests which assign a lower priority to other requests. This optimizes the use of the speech recognition module at times when it is overloaded.

One aspect of the disclosure provides a method for providing quality of service for voice queries. The method includes receiving, at data processing hardware of a query processing backend, an automated speech recognition (ASR) request from a user device. The ASR request includes a speech input captured by the user device and content metadata associated with the speech input. The speech input includes a voice query and the content metadata is generated by the user device. The method also includes determining, by the data processing hardware, a priority score for the ASR request based on the content metadata associated with the speech input. The method also includes caching, by the data processing hardware, the ASR request in a pre-processing backlog of pending ASR requests each having a corresponding priority score. The pending ASR requests in the pre-processing backlog are ranked in order of the priority scores. The method further includes providing, by the data processing hardware from the pre-processing backlog, one or more of the pending ASR requests to a backend-side ASR module based on processing availability of the backend-side ASR module. The pending ASR requests associated with higher priority scores are processed by the backend-side ASR module before pending ASR requests associated with lower priority scores.

Implementations of the disclosure may include one or more of the following optional features. In some implementations, the backend-side ASR module is configured to, in response to receiving each pending ASR request from the pre-processing backlog of pending ASR requests, process the pending ASR request to generate an ASR result for a corresponding speech input associated with the pending ASR request. In some examples, the method further includes, in response to caching one or more new ASR requests in the pre-processing backlog of pending ASR requests, re-ranking, by the data processing hardware, the pending ASR requests in the pre-processing backlog in order of the priority scores. Additionally or alternatively, the method may include rejecting, by the data processing hardware, any pending ASR requests residing in the pre-processing backlog for a period of time that satisfies a timeout threshold from being processed by the backend-side ASR module. In some implementations, the method further includes, in response to receiving a new ASR request having a respective priority score less than a priority score threshold, rejecting, by the data processing hardware, the new ASR request from being processed by the backend-side ASR module.

The content metadata associated with the speech input may represent a likelihood that the corresponding ASR will be successfully processed by the backend-side ASR module. In some implementations, the content metadata associated with the speech input represents a likelihood that processing of the corresponding ASR request will have an impact on a user associated with the user device. The content metadata associated with the speech input and generated by the user device may include at least one of: a login indicator indicating whether or not a user associated with the user device is logged in to the user device; a speaker-identification score for the speech input indicating a likelihood that the speech input matches a speaker profile associated with the user device; a broadcasted-speech score for the speech input indicating a likelihood that the speech input corresponds to broadcasted or synthesized speech output from a non-human source; a hotword confidence score indicating a likelihood that one or more terms preceding the voice query in the speech input corresponds to a predefined hotword; an activity indicator indicating whether or not a multi-turn-interaction is in progress between the user device and the query processing backend; an audio signal score of the speech input; a spatial-localization score indicating a distance and position of a user relative to the user device; a transcription of the speech input generated by an on-device ASR module residing on the user device; a user device behavior signal indicating a current behavior of the user device; or an environmental condition signal indicating current environmental conditions relative to the user device.

In some implementations, the user device is configured to, in response to detecting a hotword that precedes the voice query in a spoken utterance: capture the speech input including the voice query; generate the content metadata associated with the speech input; and transmit the corresponding ASR request to the data processing hardware. The speech input may further include the hotword. In some examples, the method further includes transmitting, from the data processing hardware, on-device processing instructions to the user device. The on-device processing instructions provide one or more criteria for locally processing at least a portion of any new speech inputs captured by the user device on-device when the user device determines the query processing backend is overloaded. In these example, the user device may be configured to determine the query processing backend is overloaded by at least one of: obtaining historical data associated with previous ASR requests communicated by the user device to the data processing hardware; receiving, from the data processing hardware, a schedule of past and/or predicted overload conditions at the query processing backend; or receiving an overload condition status notification from the data processing hardware on the fly indicating a present overload condition at the processing backend. Moreover, the one or more criteria for locally processing at least the portion of any new speech inputs may include instructing the user device to at least one of: transcribe a new speech input using a local ASR module residing on the device; interpret the transcription of the new speech input to determine a voice query corresponding to the new speech input; determine whether the user device can execute an action associated with the voice query corresponding to the new speech input; or transmit the transcription of the speech input to the query processing system when the user device is unable to execute the action associated with the voice query. In some implementations, the on-device processing instructions that provide the one or more criteria include one or more thresholds that corresponding portions of the content metadata must satisfy in order for the user device to transmit the ASR request to the query processing backend. In some examples, the on-device processing instructions further instruct the user device to drop the ASR request when at least one of the thresholds are dissatisfied.

Another aspect of the disclosure provides a system for providing quality of service for voice queries. The system includes data processing hardware of a query processing backend and memory hardware in communication with the data processing hardware. The memory hardware stores instructions that when executed on the data processing hardware cause the data processing hardware to perform operations. The operations include receiving an automated speech recognition (ASR) request from a user device. The ASR request includes a speech input captured by the user device and content metadata associated with the speech input. The speech input includes a voice query and the content metadata is generated by the user device. The operations also include determining a priority score for the ASR request based on the content metadata associated with the speech input and caching the ASR request in a pre-processing backlog of pending ASR requests each having a corresponding priority score. The pending ASR requests in the pre-processing backlog are ranked in order of the priority scores. The operations further include providing, from the pre-processing backlog, one or more of the pending ASR requests to a backend-side ASR module based on processing availability of the backend-side ASR module. The pending ASR requests associated with higher priority scores are processed by the backend-side ASR module before pending ASR requests associated with lower priority scores.

This aspect may include one or more of the following optional features. In some implementations, the backend-side ASR module is configured to, in response to receiving each pending ASR request from the pre-processing backlog of pending ASR requests, process the pending ASR request to generate an ASR result for a corresponding speech input associated with the pending ASR request. In some examples, the operations further include, in response to caching one or more new ASR requests in the pre-processing backlog of pending ASR requests, re-ranking the pending ASR requests in the pre-processing backlog in order of the priority scores. Additionally or alternatively, the operations may further include rejecting any pending ASR requests residing in the pre-processing backlog for a period of time that satisfies a timeout threshold from being processed by the backend-side ASR module. In some implementations, the operations further include, in response to receiving a new ASR request having a respective priority score less than a priority score threshold, rejecting the new ASR request from being processed by the backend-side ASR module.

The content metadata associated with the speech input may represent a likelihood that the corresponding ASR request will be successfully processed by the backend-side ASR module. In some examples, the content metadata associated with the speech input represents a likelihood that processing of the corresponding ASR request will have an impact on a user associated with the user device. The content metadata associated with the speech input and generated by the user device may include at least one of: a login indicator indicating whether or not a user associated with the user device is logged in to the user device; a speaker-identification score for the speech input indicating a likelihood that the speech input matches a speaker profile associated with the user device; a broadcasted-speech score for the speech input indicating a likelihood that the speech input corresponds to broadcasted or synthesized speech output from a non-human source; a hotword confidence score indicating a likelihood that one or more terms preceding the voice query in the speech input corresponds to a predefined hotword; an activity indicator indicating whether or not a multi-turn-interaction is in progress between the user device and the query processing backend; an audio signal score of the speech input; a spatial-localization score indicating a distance and position of a user relative to the user device; a transcription of the speech input generated by an on-device ASR module residing on the user device; a user device behavior signal indicating a current behavior of the user device; or an environmental condition signal indicating current environmental conditions relative to the user device.

In some implementations, the user device is configured to, in response to detecting a hotword that precedes the voice query in a spoken utterance: capture the speech input including the voice query; generate the content metadata associated with the speech input; and transmit the corresponding ASR request to the data processing hardware. The speech input may further include the hotword. In some examples, the operations further include transmitting on-device processing instructions to the user device. The on-device processing instructions provide one or more criteria for locally processing at least a portion of any new speech inputs captured by the user device on-device when the user device determines the query processing backend is over-loaded. In these examples, the user device may be config-ured to determine the query processing backend is over-loaded by at least one of: obtaining historical data associated with previous ASR requests communicated by the user device to the data processing hardware; receiving, from the data processing hardware, a schedule of past and/or pre-dicted overload conditions at the query processing backend; or receiving an overload condition status notification from the data processing hardware on the fly indicating a present overload condition at the processing backend. In further examples, the one or more criteria for locally processing at least the portion of any new speech inputs includes instruct-ing the user device to at least one of: transcribe a new speech input using a local ASR module residing on the device; interpret the transcription of the new speech input to deter-mine a voice query corresponding to the new speech input; determine whether the user device can execute an action associated with the voice query corresponding to the new speech input; or transmit the transcription of the speech input to the query processing system when the user device is unable to execute the action associated with the voice query. In some implementations, the on-device processing instructions that provide the one or more criteria include one or more thresholds that corresponding portions of the con-tent metadata must satisfy in order for the user device to transmit the ASR request to the query processing backend. In some examples, the on-device processing instructions further instruct the user device to drop the ASR request when at least one of the thresholds are dissatisfied.

The details of one or more implementations of the dis-closure are set forth in the accompanying drawings and the description below. Other aspects, features, and advantages will be apparent from the description and drawings, and from the claims.

DESCRIPTION OF DRAWINGS

FIG. 4 schematically illustrates a QoS manager of FIG. 1 providing on-device processing instructions to a user device.

FIG. 5 is a flowchart of an example arrangement of operations for a method of processing pending ASR requests at a query processing stack based on processing availability at the query processing stack.

Like reference symbols in the various drawings indicate like elements.

DETAILED DESCRIPTION

Figure 1:
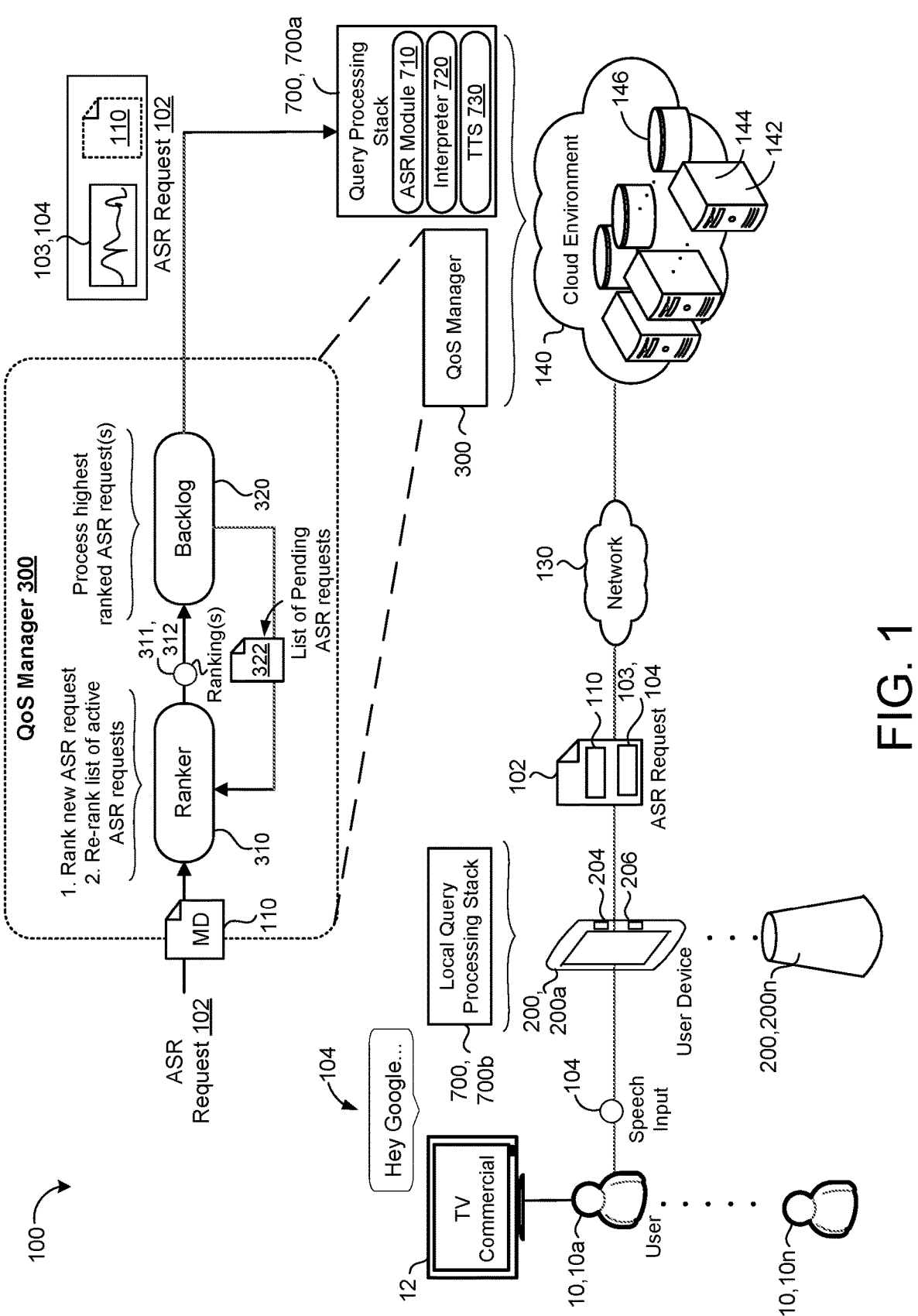
FIG. 1 schematically illustrates an example system for prioritizing pending automated speech recognition (ASR) requests received from user devices.

Referring to FIG. 1, in some implementations, a system 100 includes user devices 200, 200a-n each associated with a user 10, 10a-n, who may communicate, via network 130, with a remote system 140. Some users 10 may be associated with more than one user device 200 and/or some user devices 200 may be associated with more than one user 10 (e.g., family members of a household). The remote system 140 may be a distributed system (e.g., cloud computing environment) having scalable/elastic resources 142. The resources 142 include computing resources 144 (e.g., data processing hardware) and/or storage resources 146 (e.g. memory hardware). In some implementations, the remote system 140 includes a voice query quality of service (QoS) manager 300 and a query processing stack 700, 700a. The query processing stack 700a may be referred to as a query processing backend, a server-based or backend-side query processing stack 700a. The QoS manager 300 is configured to receive an automatic speech recognition (ASR) request 102 that includes audio data 103 and content metadata 110 associated with a speech input 104 from the user device 200. The QoS manager 300 may then assign a priority score 311 to the ASR request 102 based on at least the content metadata 110. Using the priority score 311 assigned to each ASR request 102 received and based on processing avail-ability of the query processing stack 700, the QoS manager 300 assigns a corresponding ranking 312 to each ASR request 102 and provides the ASR requests 102 to the query processing stack 700 in order of ranking 312 from highest to lowest, i.e., ASR requests having rankings 312 associated with higher priority scores 311 are processed by the query processing stack 700 before ASR requests 102 having rank-ings 312 associated with lower priority scores 311.

The user device 200 includes data processing hardware 204 and memory hardware 206. The user device 200 may include an audio capture device (e.g., microphone) for capturing and converting the speech input 104 from the user 10 into the audio data 103 (e.g., electrical signals). In some implementations, the data processing hardware 204 is con-figured to execute a query processing stack 700, 700b instead of or in lieu of the query processing stack 700a executing on the remote system 140. For instance, the query processing stack 700b may include some of the same or different components as the query processing stack 700a executing on the remote system 140 such as, without limi-tation, at least one of an on-device ASR module 220n (FIG. 2), an interpreter module 720, or a text-to-speech (TTS) module 730. In some examples, the user device 200 executes an on-device ASR module 220n (FIG. 2) for generating low-fidelity transcriptions quickly and without requiring a network connection, whereas the remote system 140 executes a server-based ASR module 710 capable of gen-erating high-fidelity transcriptions at the expense of higher latency compared to the on-device low-fidelity transcriptions. The user device 200 can be any computing device capable of communicating with the remote system 140 through the network 130. The user device 200 includes, but is not limited to, desktop computing devices and mobile computing devices, such as laptops, smart speakers, smart displays, tablets, smart phones, and wearable computing devices (e.g., headsets and/or watches).

In the example shown, the user 10 may provide the speech input 104 to the user device 200 by speaking and the user device 200 can capture and convert the speech input 104 into the audio data 103. The user device 200 may then transmit an ASR request 102 that includes the audio data 103 and content metadata 110 associated with the speech input 104 to the QoS manager 300*a* executing on the remote system 140. Here, the QoS manager 300 assigns a ranking 312 to the ASR request 102 based on at least the content metadata 110 and sends the ASR request 102 to the query processing stack 700 in order of highest ranking 312 to lowest ranking 312. The user device 200 may optionally execute the query processing stack 700*b* on-device to process the ASR request 102, or some portion of the ASR request 102. For instance, when network communications are down or not available, the user device 200 may execute the query processing stack 700*b* locally to process the ASR request 102. In some examples, the user device 200 may execute the query processing stack 700*b* locally to process the ASR request 102 when it is determined that the ASR request 102 is time sensitive, for example, an ASR request 102 to set a timer for one minute. Implementations herein further include the user device 200 executing the query processing stack 700*b* locally in scenarios when the QoS manager 300*a* executing on the remote system 140 determines/detects that the server-based query processing stack 700 is overloaded and/or presently experiencing a large spike in ASR requests 102 to process.

Figure 2:
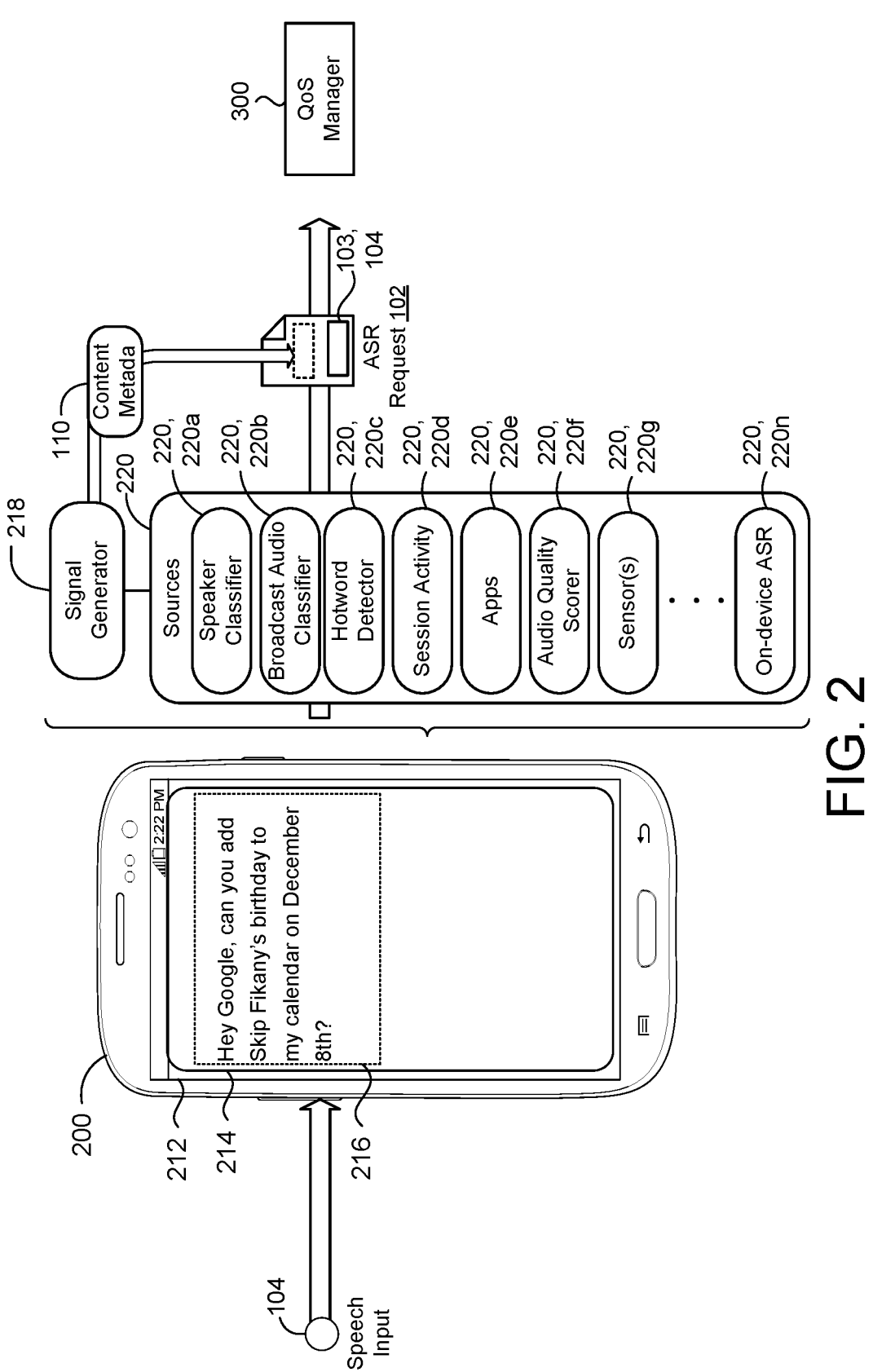
FIG. 2 schematically illustrates an example user device generating content metadata associated with a speech input captured by the user device.

The content metadata 110 obtained by the QoS manager 300 may include at least one of a speech recognition category associated with the speech input 104, an application running on the user device 200 associated with the user 10, a location of the user 10 at the time the speech input 104 was received, a user identifier identifying the user 10, demographic information associated with the user 10, whether the user 10 is signed in to the user device 200, whether the user 10 is currently part of a multi-turn interaction with the system 100, spatial-localization information which determines the distance and position of the user 10 relative to the user device 200, or ad-likeliness information obtained by executing an add classifier on the user device 200 that leverages data/information from a plurality of sources 220, 220*a-n* (FIG. 2). Specifically, and described in greater detail below with reference to FIG. 2, the user device 200 is configured to generate the content metadata 110 associated with each speech input 104 and provide the associated ASR request 102 that includes the content metadata 110 and the speech input 104 (e.g., audio data 103) to the QoS manager 300*a* executing on the remote system 140.

The QoS manager 300 includes a ranker 310 and a pre-processing backlog 320. The ranker 310 is configured to analyze the content metadata 110 contained in the ASR request 102 to determine the likelihood that the ASR request 102 is genuine, and assign the ASR request 102 a corresponding ranking 312 based on the likelihood that the ASR request 102 is genuine. As used herein, a "genuine" ASR request 102 refers to an ASR request 102 including a speech input 104 that was spoken by a real user 10 and directed to the user device 200 as a voice query for processing by the query processing stack 700. In some examples, the QoS manager 300 determines a corresponding priority score 311 for each received ASR request 102 based on the content metadata 110 contained in the ASR request 102. Here, the QoS manager 300 may assign the ranking 312 to each ASR request 102 based on the corresponding priority score 311. Thus, the priority score 311 based on the content metadata 110 for each received ASR request 102 may indicate the likelihood that the ASR request is genuine. For example, the content metadata 110 may indicate that the ASR request 102 came from a source other than one of the users 10, 10*a-n*, such as from a non-human source (e.g., television or radio) 12 during a television/radio commercial, announcement, or other programming. Accordingly, the ranker 310 determines a low priority score 311 for the ASR request 102 since the content metadata 110 indicates that the ASR request 102 is likely not genuine, thereby causing the ranker 310 to assign a low ranking 312 to the ASR request 102 based on a low likelihood that the ASR request 102 is genuine. In other examples, the content metadata 110 indicates that the ASR request 102 came from one of the users 10, 10*a-n*, thus, the ranker 310 may determine a high priority score 311 for the ASR request 102 and assign a high ranking 312 to the ASR request 102 based on a high likelihood that the ASR request 102 is genuine. Additionally or alternatively, the ranker 310 may analyze the audio data 103, and/or any other suitable information, in addition to or instead of the content metadata 110 to determine a likelihood that the ASR request 102 is genuine.

After determining the priority score 311 and assigning the ranking 312 for each ASR request 102, the ranker 310 caches the ASR request 102 in the pre-processing backlog 320 of pending ASR requests 102 each having a corresponding priority score 311 (previously determined by the ranker 310). Here, the pending ASR requests 102 in the pre-processing backlog 320 are ranked in order of the priority scores 311 such that the query processing stack 700 processes pending ASR requests 102 associated with higher rankings 312 before processing pending ASR requests 102 associated with lower rankings 312.

The ranker 310 continuously, or semi-continuously, receives a list 322 of pending ASR requests 102 in the pre-processing backlog 320 and re-ranks the pending ASR requests 102 as new ASR requests 102 are received over the network 130 by the QoS manager 300. For example, the ranker 310 may determine that a new ASR request 102 has a corresponding priority score 311 higher than any priority score 311 in the list 322 of pending ASR requests 102 currently cached in the pre-processing backlog 320 while waiting to be processed by the query processing stack 700. The backlog 320 may provide the list 322 of pending ASR requests 102 to the ranker 310 as feedback and the ranker 310 may assign the new ASR request 102 a higher ranking 312 than the rankings 312 in the list 322 of pending ASR requests 102, such that the new ASR request 102 takes precedence over the other pending ASR requests 102 in the backlog 320 for processing by the query processing stack 700. In some implementations, the ranker 310 drops at least one of the pending ASR requests 102 in the list 322. For example, the ranker 310 may determine that an amount of pending ASR requests 102 in the backlog 320 exceeds a predetermined threshold value. To clear space and/or increase bandwidth in the backlog 320 for new ASR requests 102 with higher rankings 312, the ranker 310 may drop at least one of the pending ASR requests 102 associated with a lower ranking 312. Additionally or alternatively, the ranker 310 may drop at least one of the pending ASR requests 102 in the list 322 of pending ASR requests 102 that have timed out, i.e., have been pending in the backlog 320 for a time duration exceeding a predetermined threshold value.

Each pending ASR request 102 in the pre-processing backlog 320 is waiting to be processed by the query processing stack 700 based on the rankings 312 assigned to the pending ASR requests 102. For example, the highest ranked ASR request 102 (e.g., the ASR request 102 associated with the highest priority score 311) is processed before the second highest ranked ASR request 102 (e.g., the ASR request 102 associated with the next highest priority score 311), the second highest ranked ASR request 102 is processed before the third highest ranked ASR request 102, etc. The backlog 320 continuously, or semi-continuously, communicates the list 322 to the ranker 310 to facilitate re-ranking of the pending ASR requests 102.

The query processing stack 700, 700a on the remote system 140 receives each ASR request 102 that has not been dropped or timed out, including the audio data 103 and content metadata 110 associated with the speech input 104, from the QoS manager 300 in descending order of ranking 312. The query processing stack 700 includes at least the ASR module 710, the interpreter module 720, or the TTS module 730. The ASR module 710 may perform a variety of operations on the ASR request 102, such as, for example, processing, noise modeling, acoustic modeling, language model, annotation, etc., to generate a speech recognition result (e.g., transcription) for the speech input 104. The ASR module 710 sends this speech recognition result to the interpreter 720 to determine an intent of the ASR request 102 and generate a response. For example, an ASR request 102 requesting the current time would be satisfied by the query processing stack 700 determining and generating a response of the current time in the time zone of the user 10. The TTS module 730 may convert this response from text to speech and output the response in audio form to the user device 200, which is then output as synthesized speech to the user 10 via, for example, speakers of the user device 200. Additionally or alternatively, the response may be outputted to the user device 200 in text form, which is then transmitted to the user 10 via, for example, a screen of the user device 200. In other implementations, the user device 200 may receive a response in the form of text or other data from the query processing stack 700a and convert the response to speech using an on-device TTS module.

FIG. 2 shows an example user device 200 capturing a speech input 104, collecting information/data from one or more of the plurality of sources 220, 220a-n, and generating content metadata 110 associated with the speech input 104 for inclusion in an ASR request 102 sent to the QoS manager 300. The user device 200 includes a screen 212 and executes a graphical user interface 214 for display on the screen 212. As shown in FIG. 2, the speech input 104 corresponds to a hotword ("Hey Google") and following voice query directed to the user device 200, e.g., a calendar application 220e executing on the user device 200, to add an event (Skip Fikany's birthday) on a given day (December 8$^{th}$) to the calendar application 200e. In some implementations, the user device 200 presents a transcription of the speech input 104 in a voice search/command window 216 displayed in the graphical user interface 214.

After the user device 200 receives the speech input 104, the user device 200 leverages information/data associated with the speech input 104 from the plurality of sources 220 and executes a signal generator 218 (on the data processing hardware 204) to generate the content metadata 110 that may be used to provide context or hints about the speech input 104 for use by the QoS manager 300 without requiring the QoS manager 300 or the query processing stack 700 executing on the remote system 140 to start processing the ASR request 102. The content metadata 110 associated with the speech input 104 and generated by the signal generator 218 includes at least one of a login indicator indicating whether or not a user 10 associated with the user device 200 is logged in to the user device 200; a speaker-identification score for the speech input 104 indicating a likelihood that the speech input matches a speaker profile associated with the user device 200; a broadcasted-speech score for the speech input 104 indicating a likelihood that the speech input 104 corresponds to broadcasted or synthesized speech output from a non-human source (e.g., a television); a hotword confidence score indicating a likelihood that one or more terms detected in the speech input 104 that precede the voice query corresponds to a hotword; an activity indicator indicating whether or not a multi-turn-interaction is in progress between the user device 200 and the query processing stack 700 (i.e., the query processing backend); an audio signal quality metric of the speech input 104; a spatial-localization score indicating a distance and position of a user 10 relative to the user device 200; a transcript (e.g., low-fidelity transcript) of the speech input 104 generated by the on-device ASR module 220n; a user device behavior signal indicating a current behavior of the user device 200; or an environmental condition signal indicating current environmental conditions relative to the user device 200. The plurality of sources 220 include, without limitation, at least one of a speaker classifier 220, 220a, a broadcast audio classifier 220, 200b, a hotword detector 220, 220c, a session activity log, 220, 220d, one or more applications 220, 220e executing on the user device 200, an audio quality scorer 220, 220f, one or more sensors 220, 220g of the user device 200, and the on-device ASR 220, 220n. As will become apparent, the signal generator 218 is configured to leverage data/information from any of the sources 220, as well as any other relevant sources, for generating the content metadata 110 associated with the speech input 104. Moreover, data/information obtained from two or more sources 220 more overlap, enabling the signal generator 218 to generate more robust content metadata 110.

The speaker classifier 220a may compare audio data 103 (e.g., acoustic features related to pronunciation, timing, etc.) of the speech input 104 to acoustic features for a speaker profile associated with one or more users 10 of the user device 200. For example, the speaker profile may be learned and/or generated during a speaker enrollment process by one or more users 10 of a household that are authorized to use a user device 200, such as a smart speaker. If the audio data 103 of the speech input 104 matches the acoustic features of the speaker profile for one or more users 10 associated with user device 200, the speaker classifier 220a may output a high speaker-identification score indicating that the speech input 104 was likely spoken by a user 10 associated with the user device 200. In this instance, the signal generator 218 could use the high speaker-identification score to provide content metadata 110 indicating a high likelihood that the corresponding ASR request 102 is genuine. On the other hand, the speaker classifier 220a may provide a low speaker-identification score when the audio data 103 of the speech input 104 does not match acoustic features of a speaker profile for a user 10 associated with the user device 200. Accordingly, the speaker-identification score may correspond to a confidence value or probability of the audio data 103 matching a known speaker profile.

The broadcast audio classifier 220b may analyze the audio data 103 of the speech input 104 to provide the broadcasted-speech score for the speech input indicating the likelihood that the speech input 104 corresponds to broadcasted or synthesized speech output from a non-human source 12, such as, for example, a television, a radio, a computer, or any other audio output device capable of outputting broadcasted and/or synthesized speech. As used herein, broadcasted speech refers to speech spoken by a human (e.g., newscaster, actor, radio personality, etc.) but that corresponds to audio content emanating/broadcasting from a non-human source 12 during a media event, such as a commercial, radio program, television show, and/or movie. Synthesized speech, on the other hand, refers to non-human speech generated by, for example, a text-to-speech (TTS) system. The broadcast audio classifier 220*b* may be capable of detecting watermarks or other features that may be appended to audio content emanating/broadcasting from a non-human source 12 and/or may be self-learning to differentiate between speech output from real humans in proximity to the user device 200 and speech output from non-human sources 12 that is synthesized speech or being broadcasted during a media event.

In some examples, the broadcast audio classifier 220*b* also analyzes the speaker-identification score provided by the speaker classifier 220*a* as a basis for determining the broadcasted-speech score. For instance, a high speaker-identification score output from the speaker classifier is a strong indication that the speech input 104 was not output from a non-human source 12, whereas a low speaker-identification score output from the speaker classifier 220*a* opens up the possibility that the speech input 104 may have emanated from the non-human source 12.

The hotword detector 220*c* calculates the hotword confidence score for the speech input 104 and compares the hotword confidence score to a hotword confidence score threshold. The hotword confidence score threshold represents a hotword confidence score that, when detected by the hotword detector 220*c*, triggers the user device 200 to wake-up from a sleep-state to capture the remaining portion of the speech input 104 that corresponds to the voice query and generate the ASR request 102 to be sent to the query processing stack 700. In instances where a user 10 speaks a designated hotword "Ok Google" clearly and is near the user device 200, the hotword confidence score may be high (e.g., >0.9). In some instances, a user 10 near the user device 200 may speak a phrase such as "Ok poodle" that sounds similar to the designated hotword "Ok Google", thereby resulting in a lower confidence score (e.g., 0.7) but still satisfying the hotword confidence score threshold (e.g., 0.68). Moreover, hotword confidence scores may decrease if the speaker is farther from the user device 200 or speaks less clearly. Accordingly, providing content metadata 110 that includes the hotword confidence score of the speech input 104 (i.e., an initial portion of the speech input 104) may indicate that although the hotword confidence score threshold was satisfied to trigger the user device 200 to wake-up, the hotword confidence score may be low enough to indicate that the speaker was far away and/or spoke some other phrase that sounds similar to the hotword and therefore did not intend to invoke the user device 200. Thus, the hotword confidence score can contribute to content metadata 110 indicating whether or not the ASR request is likely genuine.

The session activity log 220*d* may provide a log of interactions between the user device 200 and the query processing stack 700. For example, the log 220*d* may include timestamps of recent ASR requests 102 sent to the query processing stack 700 and corresponding TTS responses returned from the query processing stack. The signal generator 218 may access the session activity log

220*d* to determine content metadata 110 indicating whether or not a multi-turn interaction is in progress between the user device 200 and the query processing stack 700. For example, if the ASR request 102 is for a voice query that asks "Should I bring an umbrella", the session activity log 220*d* may show that the user device 200 just provided a previous voice query asking "What is the temperature going to be tomorrow morning in Detroit" and received a TTS response from the query processing stack 700 that stated "The temperature in Detroit tomorrow will be 62-degrees at 7 am and will reach 73-degrees by 11 am." Accordingly, the signal generator 218 may generate content metadata 110 for inclusion in the ASR request 102 indicating that the ASR request 102 is likely genuine because the user 10 is presently involved in a continuing discussion with the user device 200. In another example, the user 10 may have recently submitted an ASR request 102 asking the user device 200 to search for local restaurants. If a subsequent ASR request 102 is submitted requesting the user device 200 to make a reservation at one of the local restaurants, the session activity log 220*d* may indicate that a multi-turn interaction is in progress between the user device 200 and the query processing stack 700. Moreover, the signal generator 218 could further determine that a specific application 220*e*, such as a digital voice assistant, is currently executing on the user device 200 to provide the activity indicator for a multi-turn-interaction in progress between the user device 200 and the query processing stack is in progress. In some examples, the digital voice assistant application 220*e* logs session activity in the session activity log 220*d* for use by the signal generator 218.

The audio quality scorer 220*f* may be configured to determine the audio quality score of the speech input. In some examples, the audio quality scorer 220*f* measures a loudness (e.g., decibels) of the audio data 103 associated with the speech input 104. The measured loudness may correspond to the portion of the audio data 103 that corresponds to the hotword detected by the hotword detector 220*c*, the portion of the audio data 103 that corresponds to the voice query following the hotword, or the entire audio data 103 captured by the user device 200. The audio quality score of the speech input 104 may further indicate a level of background noise present in the audio data 103. Thus, the audio quality score may simply refer to a confidence score of the audio quality of the speech input 104, i.e., how well the speech input 104 was captured by a microphone of the user device 200.

The signal generator 218 may determine the content metadata 110 including the spatial-localization score for the speech input 104 by leveraging data/information from multiple sources 220 in order to, for example, indicate a distance and position of a user 10 relative to a user device 200. In some examples, the hotword confidence score from the hotword detector 220*c* and/or the audio quality score from the audio quality scorer 220*f* may contribute to the spatial-localization score. For instance, a low hotword confidence score and/or a low audio quality score may be used to indicate that a source (e.g., user 10) that spoke the speech input 104 is not nearby the user device 200. Additionally or alternatively, the spatial-localization score may be based on data/information collected by one or more sensors 220, 200*g* of the user device 200. The sensors 220*g* may include, without limitation, at least one of a light-detecting sensor, an accelerometer, a microphone, a gyroscope, a magnetometer, a proximity sensor, a touchscreen sensor, a barometer, or a global positioning system (GPS) sensor. For example, if the user device 200 includes a pair of smart headphones, one or more of the sensors 220*g* may be used to determine whether a user 10 is presently wearing the headphones or whether the headphones are not being worn, and thus, not in use. Whether or not the user 10 is wearing the smart headphones may be determined by one of the sensors 220g, e.g., a proximity sensor, an accelerometer, etc. In this example, the signal generator 218 may generate a high spatial-localization score (e.g., binary value of 1) when the user 10 is wearing the smart headphones and a low spatial-localization score (e.g., binary value of 0) when the user 10 is not wearing the smart headphones. As another example, one of the sensors 220g may be capable of detecting light energy in the environment of a user device 200 located in a room of a house to indicate whether or not the room is dark. For instance, a level of light energy below a specified threshold may indicate that the user device 200 is located in a dark room. As such, the signal generator 218 may determine a low spatial-localization score when the user device 200 is located in a dark room during the evening (e.g., by further accessing the current time of day) to indicate that no users 10 are likely present in the same room as the user device 200. Conversely, the signal generator 218 when determining the spatial-localization score may leverage information from the session activity log 220d indicating that there was a recent ASR request 102 requesting the user device 200 to turn off the lights in the room, and thus, the spatial-localization score may instead reflect that there are users 10 in the dark room. As yet another example, a user device 200 that is part of an infotainment system of a vehicle may use sensors 220g to determine whether a user 10 is in a cabin of the vehicle, whether the vehicle is running, etc. In this example, despite the user device 200 capturing a speech input 104, the fact that nobody is in the cabin of the vehicle and the vehicle is not in operation may indicate that the speech input 104 was directed to some other user device 200 or was background noise accidently captured by the info-tainment system.

The content metadata 110 including the login indicator may determine whether a user 10 is logged into the user device 200, e.g., the user 10 entered proper credentials to access/unlock the user device 200. The presence of a user 10 logged into the user device 200 may increase the likelihood that the ASR request 102 is genuine. Further, the login indicator may indicate whether the user 10 is logged into a particular application 220e executing on the user device 200. For example, the signal generator 218 may generate the login indicator by accessing a calendar application 220e executing on the user device 200 of the logged-in user 10 and determine that the logged-in user 10 has a meeting in five minutes. In this example, the login indicator may provide content metadata 110 that indicates it is important to quickly process the ASR request 102 for the speech input 104 because the logged-in user 10 may need information (e.g., directions, notes, etc.) for the meeting. As another example, the logged-in user 10 may be a homeowner, and the signal generator 218 may generate the login indicator by accessing the calendar application 220e to determine that the logged-in user 10 has an appointment at a location other than the home of the logged-in user 10. If the user device 200 is, for example, a smart speaker located at the home of the logged-in user 10 and the user device 200 is triggered upon detecting a spoken hotword at the same time of the appointment in the calendar application 220e, the login indicator may provide content metadata 110 indicating that there is a high likelihood that the logged-in user 10 did not provide the speech input 104, thereby rendering the corresponding ASR request 102 as being unlikely genuine. The user 10 may be required to explicitly consent to providing log-in information, application use, and location information.

The signal generator 218 may determine the content metadata 110 including the user device behavior signal by leveraging data/information from multiple sources 220 in order to, for example, indicate how likely a user 10 is interacting with the user device 200 at the time the speech input 104 is captured. For instance, information from one or more sensors 220g may indicate whether the user device is upside down, face down (e.g., when the user device is a smart phone or tablet), whether the user device 200 is in a drawer/purse, etc. In these scenarios, there is a strong likelihood the user device 200 was accidently triggered, thereby rendering the corresponding ASR request 102 as being unlikely genuine. Information from sensors 220g may further include location of the user device (e.g., obtained from the GPS sensor 220g) and/or signal strength of the user device's 200 network connection. For instance, a user device behavior signal indicating that the user device 200 currently has poor signal strength and is at a location notorious for having spotty cell coverage (e.g., based on historical knowledge), can be useful to the QoS manager 300 in prioritizing the corresponding ASR request 102 because there is a strong possibility, that even if the ASR request 102 is genuine, the user device 200 may not be able to receive a corresponding response (e.g., ASR output and/or TTS response) processed by the query processing stack. In this situation, when the query processing stack 700 is experiencing high traffic spikes, it may be beneficial to process other pending ASR requests 102 first that will produce corresponding responses having a stronger likelihood of being successfully returned back to their respective user devices 200.

The signal generator 218 may determine the content metadata 110 including the environmental condition signal by leveraging data/information from multiple sources 220 in order to, for example, assess and analyze conditions surrounding the user device 200. Specifically, the environmental condition signal may leverage one or more of the sensors 220g to determine environmental conditions surrounding the user device 200. For example, the environmental condition signal may indicate that there are several user devices 200 in proximity of the user device 200, conditions of the network the user device 200 is connected to (e.g., the network is overloaded), GPS coordinates of the user device 200, whether the user device 200 is outside, presently moving, approaching an area of poor cellular or data reception, etc.

As set forth in the remarks above, a user device 200 may have the ability to execute an on-device ASR module 220n (e.g., the local query processing stack 700b) for generating low-fidelity transcriptions quickly and without requiring a network connection. Advantageously, the content metadata 110 generated by the signal generator 218 may include a low-fidelity transcription of the speech input 104 generated by the on-device ASR module 220n to provide potentially relevant information or details about the ASR request 102 to the QoS manager 300. Here, the low-fidelity transcription may reveal that the ASR request 102 includes a time-sensitive voice query (e.g., a command to set a timer for one minute), thereby informing the QoS manager 300 to assign a high priority score 311 to the ASR request 102 so that the ASR request 102 is processed immediately. In this same scenario, if the query processing stack 700a is overloaded and at full processing capacity at the time the ASR request 102 is cached in the backlog 320, the query processing stack 700a may be unable to immediately process the ASR request 102 (e.g., send instructions to set the timer for one minute) and may simply drop the ASR request 102 and optionally inform the user 10 that the request cannot be completed at the moment. This would be preferable to the user 10 since setting the timer for a short duration is of little use after time lapses since providing the ASR request 102. Yet, if the command were to set the timer for a longer duration, such as 10 minutes, it may be permissible to allow the ASR request 102 to remain pending and cached in the pre-processing backlog 320 until the query processing stack 700a is able to process the ASR request 102, whereby the instructions for setting the timer could compensate for the latency caused by the increase in traffic while the ASR request 102 was pending in the pre-processing backlog 320.

In the example shown, after the signal generator 218 compiles and generates the content metadata 110 associated with the speech input 104, the user device 200 imbeds the content metadata 110 for inclusion in the ASR request 102 together with the corresponding speech input 104 and audio data 103. The user device 200 then sends the ASR request 102 to the QoS manager 300.

Figure 3A:
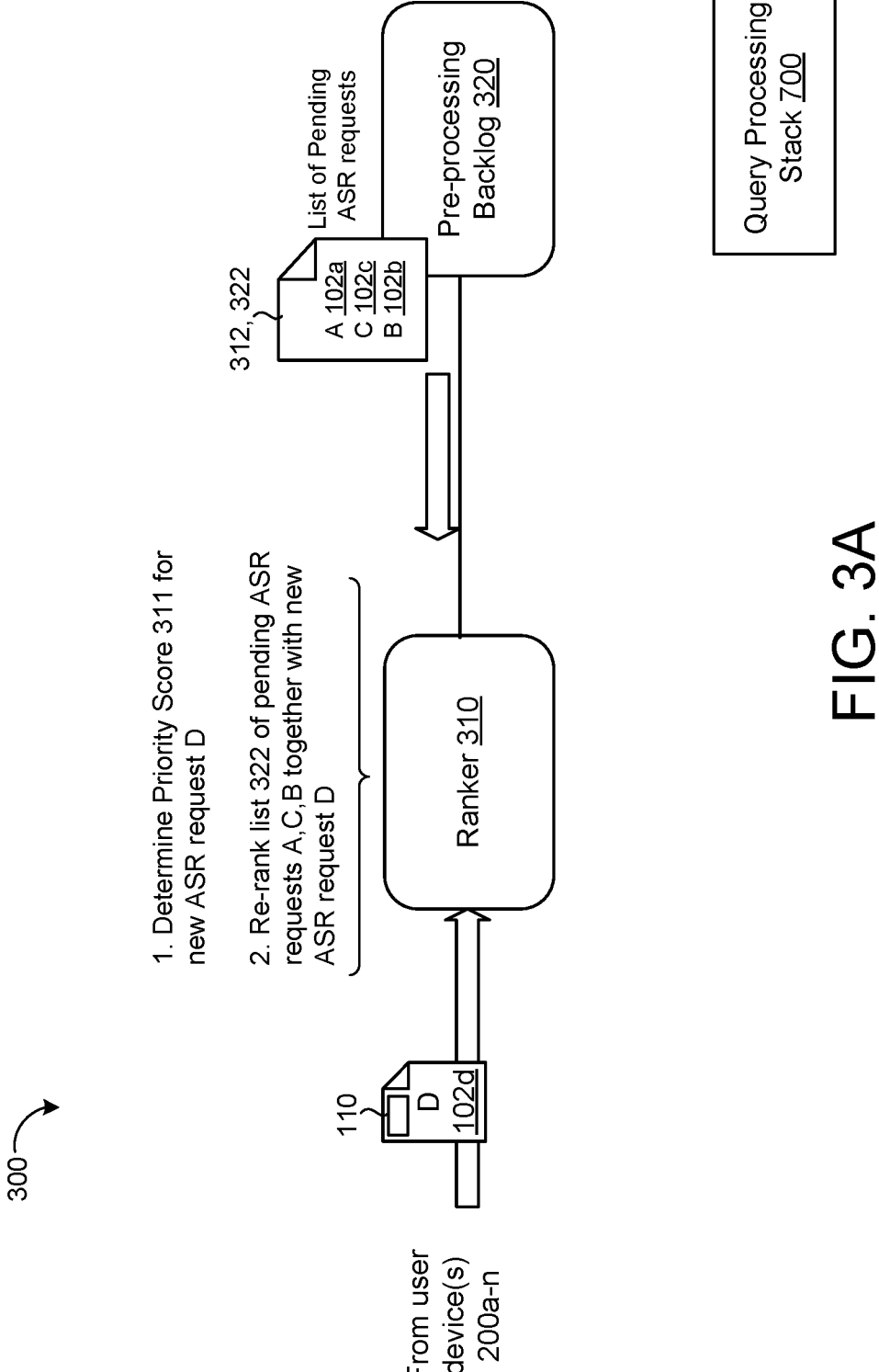
FIGS. 3A-3C schematically illustrate an example voice query quality of service (QoS) manager configured to con-tinuously re-rank pending ASR requests.
Figure 3B:
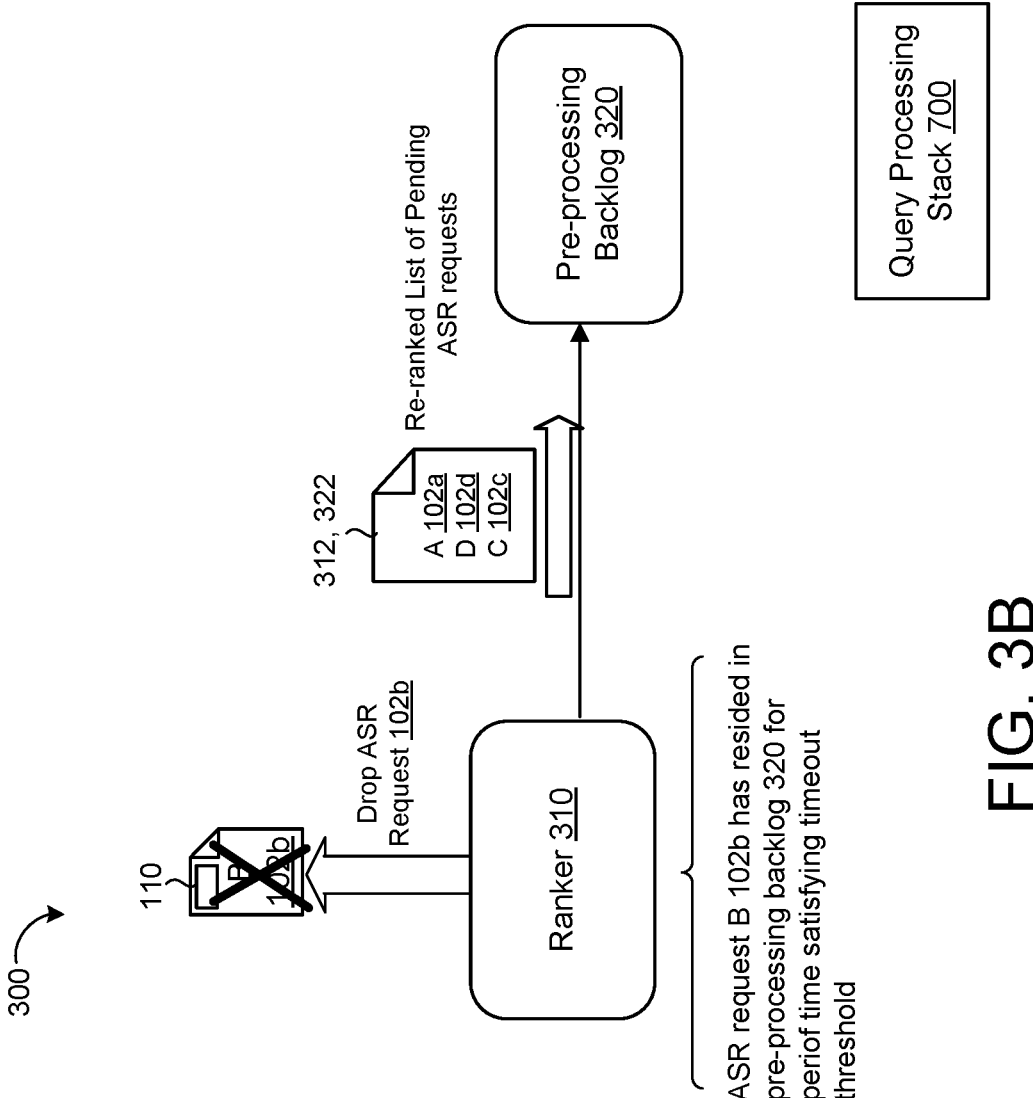
Figure 3C:
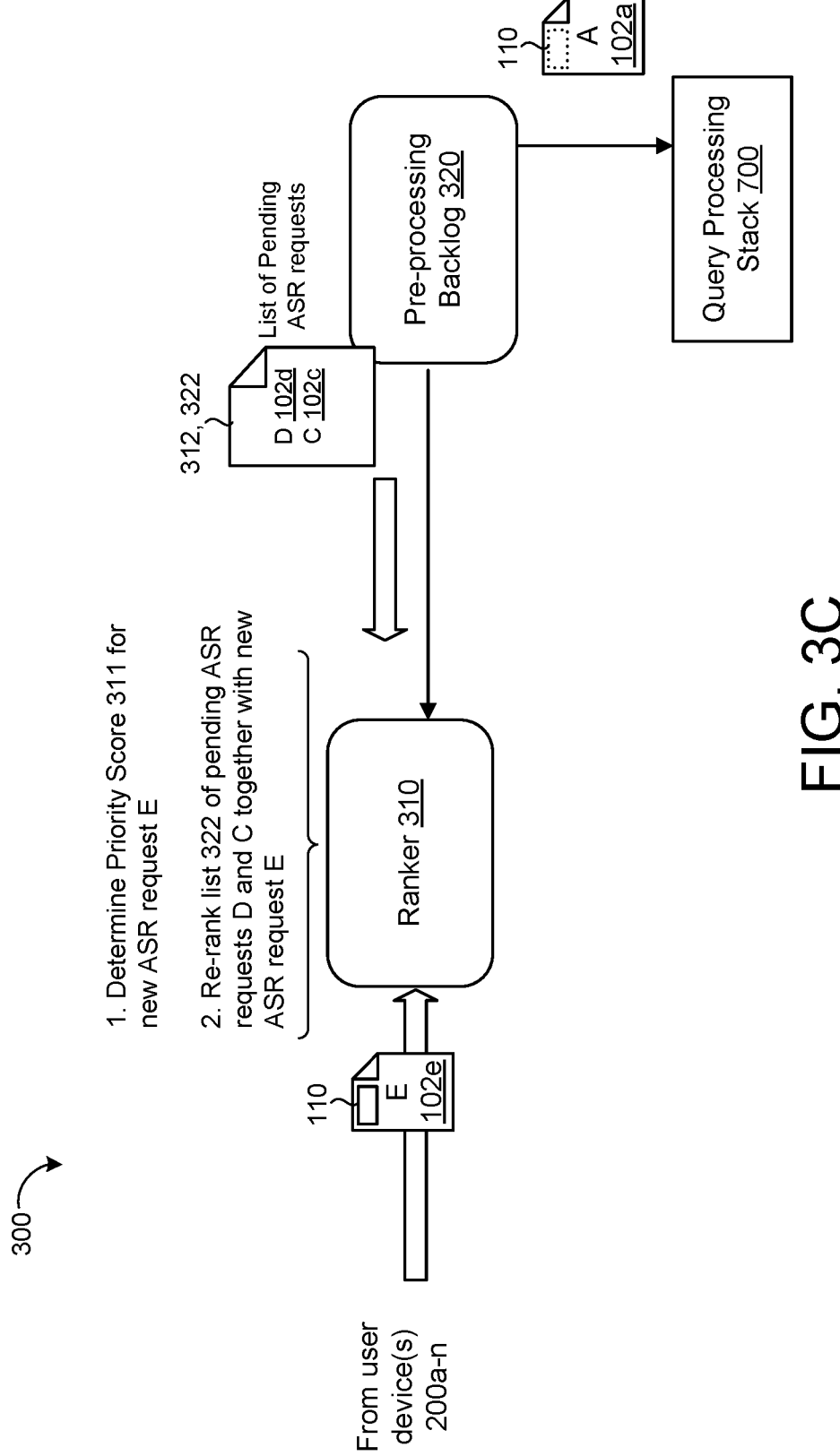

FIGS. 3A-3C provide schematic views of the voice query QoS manager 300 assigning rankings 312 to ASR requests 102 received from user devices 200 and providing the ASR requests 102 to the query processing stack 700 in order of ranking 312 from highest to lowest based on processing availability of the query processing stack 700. The query processing stack 700 may include, without limitation, at least one of the ASR module 710 (FIG. 1), the interpreter module 720 (FIG. 1), or the TTS module 730 (FIG. 1). In the example shown, the query processing stack 700 may be currently experiencing a large traffic spike of ASR requests 102 that cause the query processing stack 700 to be overloaded. For example, a television commercial airing during a large media event (e.g., the Superbowl) may include a spoken hotword that, when output from televisions (e.g., non-human source 12) in user households, causes speech-enabled user devices 200 in those households to trigger and generate false ASR requests 102 that include audio data 103 captured after detection of the hotword output from the televisions.

Referring to FIG. 3A, the pre-processing backlog 320 includes pending ASR requests A 102a, B 102b, C 102c waiting to be processed by the query processing stack 700 when the ranker 310 of the voice query QoS manager 300 receives a new ASR request D 102d from a user device 200. The ranker 310 may determine a corresponding priority score 311 for the new ASR request D 102d based on the content metadata 110 associated with the new ASR request D 102d. At the time the new ASR request D 102d is received, the pending ASR requests 102a, 102b, 102c in the pre-processing backlog 320 are ranked in order of their priority scores 311 such that ASR request A 102a is associated with a highest ranking 312, ASR request C 102b is associated with the next highest ranking 312, and ASR request B 102b is associated with a lowest ranking 312. Thus, while ASR request C 102c may have been received at the QoS manager 300 from a corresponding user device 200 after the QoS manager 300 received the ASR request B 102b, the ranker 310 assigns a rank 312 to the ASR request C 102c that is higher than a rank 312 assigned to the ASR request B 102b. The pre-processing backlog 320 can include thousands to millions of pending ASR requests 102 ranked in order of priority scores 311 waiting to be processed by the query processing stack 700. With continued reference to FIG. 3A, the pre-processing backlog 320 provides a list 322 of the pending ASR requests A 102a, C 102c, B 102b to the ranker 310 and the ranker 310 re-ranks the pending ASR requests A 102a, C 102c, B 102b together with the new ASR request D 102d based on the priority scores.

In some implementations, the ranker 310 rejects any pending ASR requests 102 that reside in the pre-processing backlog 320 for a period of time that satisfies a timeout threshold from being processed by query processing stack 700 (e.g., the backend-side ASR module 710). FIG. 3B shows the ranker 310 rejecting the pending ASR request B 102b from being processed by the query processing stack 700 since the pending ASR request B 102b satisfies the timeout threshold. For instance, the pending ASR request B 102b may have included such a low priority score 311 that resulted in the ASR request B 102b staying at the bottom of the list 322 so that the ASR request B 102b never got processed even as new ASR requests 102 were received later in time. Accordingly, the ASR request B 102b is dropped from the pre-processing backlog 320. FIG. 3B further shows the ranker 310 determining that the new ASR request D 102d includes a priority score 311 that is higher than the priority score 311 of the pending ASR request C 102c and lower than the priority score of the pending ASR request A 102a. As such, the ranker 310 provides a re-ranked list 322 of pending ASR requests A 102a, D 102d, C 102c to the pre-processing backlog 320 such that ASR request A 102a is still associated with a highest ranking 312, ASR request D 102d is now associated with the next highest ranking 312, and ASR request C 102c is now associated with a lowest ranking 312. Thus, the new ASR request D 102d ranked higher than the ASR request C 102c in the list 322 of pending ASR requests 102 results in the new ASR request D 102d taking precedence over the ASR request C 102c in the backlog 320 for processing by the query processing stack 700. The ASR request A 102a, however, takes precedence over the new ASR request D 102d for processing by the query processing stack 700.

Referring to FIG. 3C, the query processing stack 700 is available to process a next pending ASR request 102 cached in the pre-processing backlog 320. Since, the ASR request A 102a is associated with the highest ranking 312 in the list 322 of pending ASR requests 102 waiting to be processed in the pre-processing back log 320, the pre-processing backlog 320 provides the ASR request A 102a to the query processing stack 700 for processing. Accordingly, the ASR request A 102a is removed from the backlog 320 and the list 322 of pending ASR requests 102.

At the same time the ASR request A 102a is provided to the query processing stack 700 for processing, the ranker 310 of the voice query QoS manager 300 receives a new ASR request E 102e from a corresponding user device 200 and receives, as feedback, the list 322 of the pending ASR requests D 102d, C 102c from the pre-processing backlog 320. Here, the ranker 310 may determine a corresponding priority score 311 for the new ASR request E 102e based on the content metadata 110 associated with the new ASR request E 102e, and then re-rank the pending ASR requests D 102d, C 102c together with the new ASR request E 102e based on the priority scores. The continuous re-ranking of pending ASR requests 102 in pre-processing backlog 320 as new ASR requests 102 are received is an iterative process and is dependent upon processing availability of the query processing stack 700.

FIG. 4 shows a schematic view 400 of the QoS manager 300 communicating on-device processing instructions 420 to a user device 200 that allow the user device 200 to decide whether or not to send ASR requests 102 to the query processing stack 700 (e.g., query processing backend) for processing when a high load condition is present at the query processing stack. The high load condition may indicate the query processing stack 700a is overloaded due to a large traffic spike in the number of ASR requests 102 sent to the query processing stack 700 for processing. The QoS manager 300 may provide the on-device processing instructions 420 to all, or selected sub-sets, of a population of voice enabled user devices 200 that the query processing stack 700a is responsible for processing. User devices 200 associated with one device type (e.g., smart speaker) may receive different ASR request instructions 420 than user devices 200 associated with another device type (e.g., smart phone). The on-device processing instructions 420 may provide one or more criteria for locally processing (e.g., at the on-device query processing stack 700b) at least a portion of any new speech inputs 104 captured by the user device 200 on-device when the user device 200 determines the query processing stack 700a is overloaded.

The on-device processing instructions 420 may provide criteria for sending ASR requests 102 to the query processing stack 700a when query processing stack 700a is overloaded based on the content metadata 110 associated with the ASR requests 102. In some implementations, the on-device processing instructions 420 provide one or more thresholds that corresponding portions of the content metadata 110 must satisfy in order for the user device 200 to transmit the ASR request 102 to the query processing stack 700a during the high load condition. For instance, the on-device processing instructions 420 may provide a hotword confidence score threshold that a hotword confidence score must satisfy and/or an audio quality score threshold that an audio quality score of a speech input 104 must satisfy. While the user devices 200 normally apply default thresholds, the thresholds provided in the on-device processing instructions 420 may be more conservative so that only ASR requests 102 with a high confidence of being genuine (or having a high impact on the user) are sent to the query processing stack 700a for processing. In an example, the user device 200 may normally send ASR requests 102 associated with hotword confidence scores greater than 0.68 to the query processing stack 700a for processing. However, when the query processing stack 700a is overloaded, the on-device processing instructions 420 may indicate that ASR requests 102 must be associated with hotword confidence scores of at least 0.8 in order to be sent to the query processing stack 700a for processing. The on-device processing instructions 420 may further instruct the user device 200 to drop the ASR request 102 when at least one of the thresholds are dissatisfied. The QoS manager 300 may send the on-device processing instructions 420 on the fly whenever the high load condition is present, or the QoS manager 300 may send the on-device processing instructions 420 to the user devices 200 at any time so that the user devices 200 can apply/execute the on-device processing instructions 420 when high load conditions occur at later times. Audio quality thresholds can be similarly provided for use by the user devices 200 in filtering out ASR requests 102 having audio quality that does not meet thresholds defined by the instructions 420 when the query processing stack 700a is overloaded.

In the example shown, the user device 200 captures a speech input 104 and generates content metadata 110 associated with the speech input 104. For instance, the user device 200 executes a signal generator 218 configured to generate the content metadata 110 based on information/data obtained from one or more of the sources 220. The content metadata 110 generated by the user devices 200 is described above with reference with FIG. 2. Before sending (or locally processing) a corresponding ASR request 102 that includes the speech input 104 and associated content metadata 110, the user device 200 may determine whether a high load condition exists at the query processing stack 700a. In some examples, the user device 200 receives a notification 410 (e.g., an overload condition status notification) from the QoS manager 300 on the fly indicating the presence of the overload condition at the query processing stack 700a. Additionally or alternatively, the user device 200 may receive notifications 410 that include a schedule of past and/or predicted overload conditions at the query processing stack 700a. The user device 200 may store this schedule on the memory hardware 206.

In other examples, the user device 200 determines the overload condition is present at the query processing stack 700a by obtaining historical data 250 (e.g., ASR request history) associated with previous ASR requests 102 communicated by the user device 200 to the query processing stack 700a. The historical data 250 may be stored on the memory hardware 206 of the user device 200 (or stored remotely). The historical data 250 may indicate specific dates, days, times, etc. where the user device 200 and/or other user devices 200 have experienced scenarios when the query processing stack 700a was overloaded. For example, every weekday night at approximately 7:36 pm during the last 2-weeks the user device 200 has experienced an overload condition at the query processing stack. In this example, a television commercial during the show Jeopardy may include a phrase ("Hey poodle") spoken by an actor with an accent that sounds substantially similar to a designated hotword ("Hey Google") resulting in false triggering of voice enabled devices in a multitude of households.

Additionally, the on-device processing instructions 420 may provide one or more criteria for locally processing at least a portion of any new speech inputs 104 captured by the user device 200 on-device when the user device 200 determines the query processing stack 700a is overloaded. For instance, the one or more criteria for locally processing at least the portion of any new speech inputs 104 may include instructing the user device 200 to at least one of: transcribe a new speech input 104 using the local ASR module 200n (e.g., when available) residing on the user device 200; interpret the transcription of the new speech input 104 to determine a voice query corresponding to the new speech input 104; determine whether the user device 200 can execute an action associated with the voice query corresponding to the new speech input 104; or transmit the transcription of the speech input 104 to the query processing stack 700a when the user device 200 is unable to execute the action associated with the voice query. In some implementations, the one or more criteria provided by the on-device processing instructions 420 delegate some portions of the ASR request 102 for local processing by the user device 200 while the query processing stack 700a processes other portions. For instance, the user device 200 may include a client-side TTS module so that the query processing stack 700a can provide an ASR response to the user device 200 in text and the user device 200 may use the client-side TTS module to generate corresponding synthesized speech. This scenarios would alleviate the server-side query processing stack 700a from having to generate a TTS response during the overload condition.

FIG. 5 is a flowchart of an example arrangement of operations for a method 500 of processing pending ASR requests 102 at a query processing stack 700a (e.g., a backend-side ASR module 710a at the query processing stack 700a) based on processing availability at the query processing stack 700*a*. At operation 502, the method 500 includes receiving, at data processing hardware 144 of the query processing stack 700*a* (e.g. query processing backend), an ASR request 102 from a user device 200. The ASR request 102 includes a speech input 104 captured by the user device 200 that includes a voice query and content metadata 110 associated with the speech input 104. The content metadata 110 is generated by the user device 200, as described above with reference to FIG. 2. At operation 504, the method 500 includes determining, by the data processing hardware 144, a priority score 311 for the ASR request 102 based on the content metadata 110 associated with the speech input.

At operation 506, the method 500 includes caching, by the data processing hardware 144, the ASR request 102 in a pre-processing backlog 320 of pending ASR requests 102 each having a corresponding priority score 311. The pending ASR requests 102 in the pre-processing backlog 320 are ranked in order of the priority scores 311, as described above with reference to FIGS. 3A-3C. The pre-processing backlog 320 may reside on the storage resources (e.g., memory hardware) 146 of the remote system 140. At operation 508, the method 500 includes providing, by the data processing hardware 144 from the pre-processing backlog 320, one or more of the pending ASR requests 102 to the backend-side ASR module 710 (or other module at the query processing stack 700*a*) based on processing availability of the backend-side ASR module 710. As described above with reference to FIGS. 3A-3C, the pending ASR requests 102 in the backlog 320 that are associated with higher priority scores 311 are processed by the backend-side ASR module 710 before the pending ASR requests 102 associated with lower priority scores 311.

Figure 6:
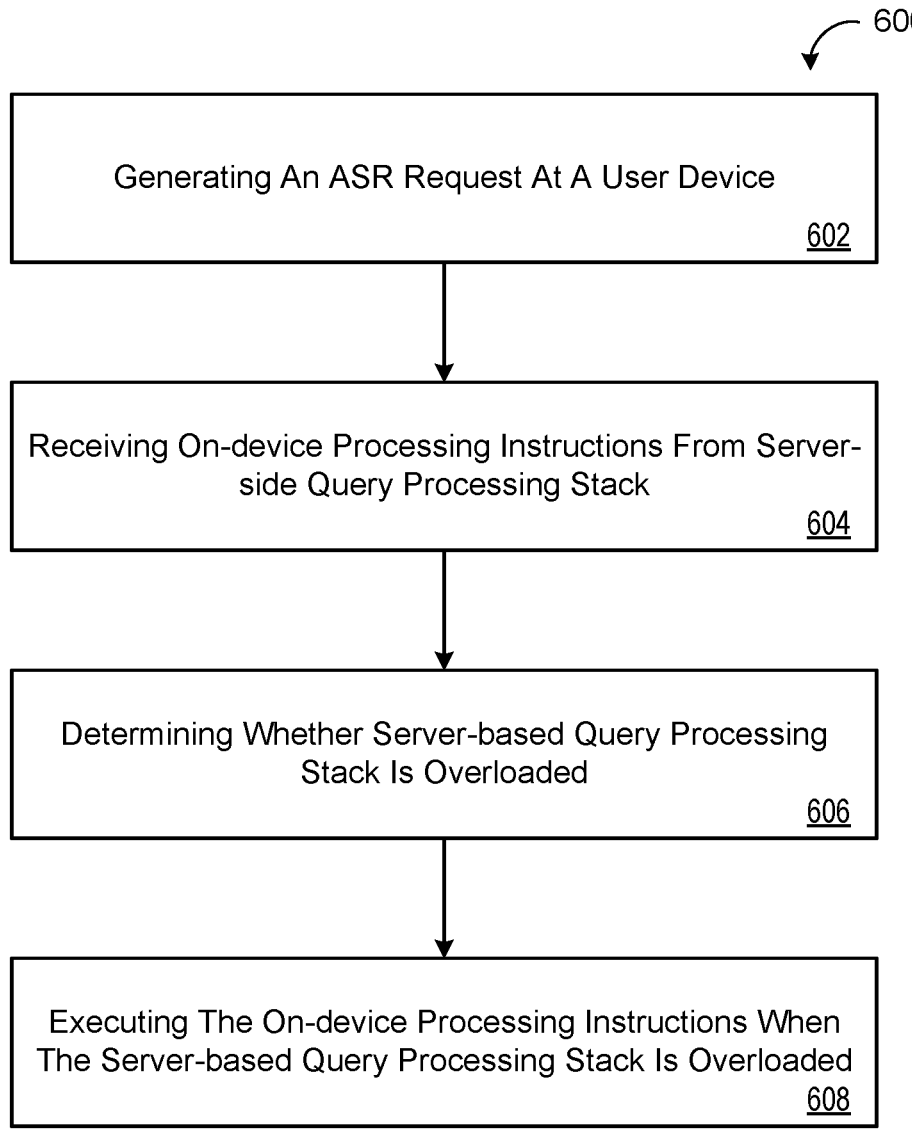
FIG. 6 is a flowchart of an example arrangement of operations for a method of executing on-device processing instructions when a server-based query processing stack is overloaded.

FIG. 6 is a flowchart of an example arrangement of operations for a method 600 of executing on-device processing instructions when a server-based query processing stack 700*a* is overloaded (e.g., an overload condition is present at the stack 700*a*). The method 600 may execute on the data processing hardware 204 of the user device 200. At operation 602, the method 600 includes generating an ASR request 102 at the user device 200. Here, the ASR request 102 includes a speech input 104 captured by the user device 200 that includes a voice query, as well as content metadata 110 generated by the user device 200 and associated with the speech input 104. Generating content metadata 110 associated with speech inputs 104 is described above with reference to FIG. 2. At operation 604, the method includes receiving, at the user device 200, on-device processing instructions 420 from the server-side query processing stack 700*a*. For instance, FIG. 4 shows the user device 200 receiving the on-device processing instructions 420. The on-device processing instructions 420 may provide criteria for sending ASR requests 102 to the query processing stack 700*a* when query processing stack 700*a* is overloaded based on the content metadata 110 associated with the ASR requests 102. In some implementations, the on-device processing instructions 420 provide one or more thresholds that corresponding portions of the content metadata 110 must satisfy in order for the user device 200 to transmit the ASR request 102 to the query processing stack 700*a* during the overload condition.

At operation 606, the method 600 also includes determining, by the user device 200, whether the server-side query processing stack 700*a* is overloaded. As described above in greater detail with reference to FIG. 4, the user device 200 may determine the overload condition based on at least one of historical data 250 (e.g., prediction-based) associated with previous ASR requests communicated by the user device 200 (and/or other user devices) to the query processing stack 700*a* or upon receiving a notification 410 from the query processing stack 700*a*. The notification 410*a* may include a schedule of past and/or predicted overload conditions at the query processing stack 700*a* and/or an overload condition status notification sent by the query processing stack 700*a* on the fly to indicate a present overload condition. At operation 608, when the user device 200 determines the query processing stack 700*a* is overloaded, the method 600 includes executing, by the user device 200, the on-device processing instructions 420. Executing the on-device processing instructions 420 by the user device 200 is described above with reference to FIG. 4.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 7:
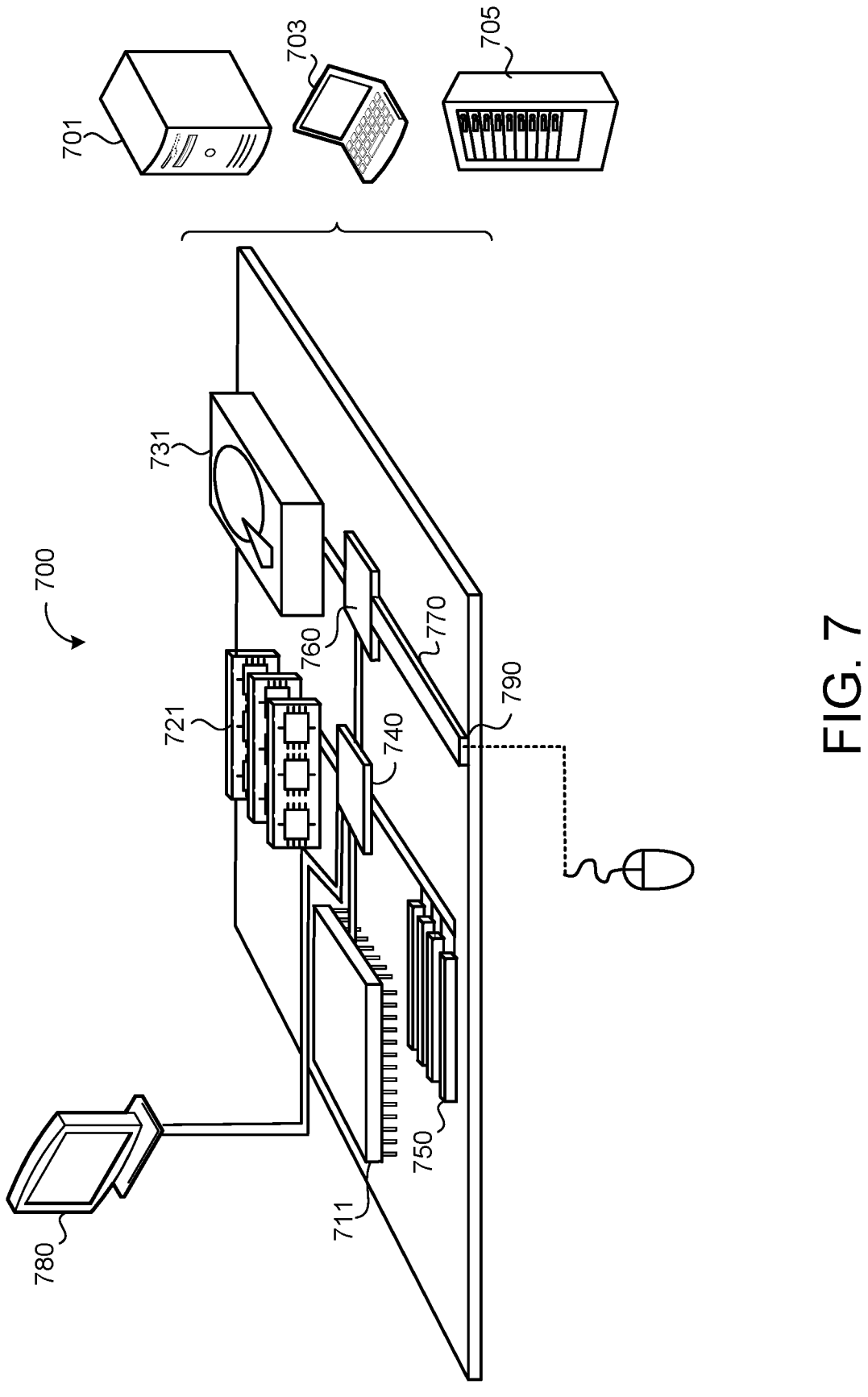
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 711 (e.g., data processing hardware 144), memory 721 (e.g., memory hardware 146), a storage device 731, a high-speed interface/controller 740 connecting to the memory 721 and high-speed expansion ports 750, and a low speed interface/controller 760 connecting to a low speed bus 770 and a storage device 731. Each of the components 711, 721, 731, 740, 750, and 760, are interconnected using various busses, and may be mounted on a common motherboard or in other manners as appropriate. The processor 711 can process instructions for execution within the computing device 700, including instructions stored in the memory 721 or on the storage device 731 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 721 stores information non-transitorily within the computing device 700. The memory 721 may be a computer-readable medium, a volatile memory unit(s), or non-volatile memory unit(s). The non-transitory memory 721 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 731 is capable of providing mass storage for the computing device 700. In some implementations, the storage device 731 is a computer-readable medium. In various different implementations, the storage device 731 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 721, the storage device 731, or memory on processor 711.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 721, the display 780 (e.g., through a graphics processor or accelerator), and to the high-speed expansion ports 750, which may accept various expansion cards (not shown). In some implementations, the low-speed controller 760 is coupled to the storage device 731 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 701, as a laptop computer 703, or as part of a rack server system 705.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware on a voice enabled device that causes the data processing hardware to perform operations comprising:

receiving an initial portion of a speech input captured by the voice enabled device;

detecting, by a hotword detector, a presence of a keyword in the initial portion of the speech input; and in response to detecting the presence of the keyword in the initial portion of the speech input:

triggering the voice enabled device to wake-up from a sleep state and capture a remaining portion of the speech input;

determining content metadata indicating a likelihood that the speech input is directed toward the voice enabled device by:

separate from performing automated speech recognition on audio data corresponding to the speech input captured by the voice enabled device, processing the audio data; and determining that the voice enabled device is face down;

receiving on-device processing instructions from a server-side query processing stack executing on a remote server in communication with the voice enabled device; and based on the content metadata and the on-device processing instructions, instructing the voice enabled device to drop the speech input from being processed by a query processing stack.

2. The computer-implemented method of claim 1, wherein the content metadata determined by processing the audio data comprises a confidence score of an audio quality associated with the speech input.

3. The computer-implemented method of claim 2, wherein the operations further comprise:

determining that the confidence score of the audio quality associated with the speech input dissatisfies a threshold, wherein instructing the voice enabled device to drop the speech input from being processed by the query processing stack is further based on determining that the confidence score associated with the speech input dissatisfies the threshold.

4. The computer-implemented method of claim 1, wherein the content metadata determined by processing the audio data comprises an audio quality score associated with the speech input.

5. The computer-implemented method of claim 4, wherein the audio quality score indicates a level of background noise present in the audio data.

6. The computer-implemented method of claim 1, wherein the operations further comprise, in response to detecting the presence of the keyword in the initial portion of the speech input, processing the audio data to determine a speaker-identification score for the speech input indicating a likelihood that the speech input matches a speaker profile associated with a user of the voice enabled device.

7. The computer-implemented method of claim 1, wherein the operations further comprise, in response to detecting the presence of the keyword in the initial portion of the speech input:

transcribing the speech input using a local ASR module residing on the voice enabled device, wherein instructing the voice enabled device to drop the speech input from being processed by the query processing stack comprises instructing the voice enabled device to drop the speech input from being processed by the query processing stack.

8. The computer-implemented method of claim 1, wherein the voice enabled device comprises a smart phone.

9. The computer-implemented method of claim 1, wherein the voice enabled device comprises a smart speaker.

10. The computer-implemented method of claim 1, wherein the voice enabled device comprises a tablet.

11. A system comprising:

data processing hardware of a user device; and memory hardware in communication with the data processing hardware and storing instructions that when executed on the data processing hardware cause the data processing hardware to perform operations comprising:

receiving an initial portion of a speech input captured by a voice enabled device;

detecting, by a hotword detector, a presence of a keyword in the initial portion of the speech input; and in response to detecting the presence of the keyword in the initial portion of the speech input:

triggering the voice enabled device to wake-up from a sleep state and capture a remaining portion of the speech input;

determining content metadata indicating a likelihood that the speech input is directed toward the voice enabled device by:

separate from performing automated speech recognition on audio data corresponding to the speech input captured by the voice enabled device, processing the audio data; and determining that the voice enabled device is face down;

receiving on-device processing instructions from a server-side query processing stack executing on a remote server in communication with the voice enabled device; and based on the content metadata and the on-device processing instructions, instructing the voice enabled device to drop the speech input from being processed by a query processing stack.

12. The system of claim 11, wherein the content metadata determined by processing the audio data comprises a confidence score of an audio quality associated with the speech input.

13. The system of claim 12, wherein the operations further comprise:

determining that the confidence score of the audio quality associated with the speech input dissatisfies a threshold, wherein instructing the voice enabled device to drop the speech input from being processed by the query processing stack is further based on determining that the confidence score associated with the speech input dissatisfies the threshold.

14. The system of claim 11, wherein the content metadata determined by processing the audio data comprises an audio quality score associated with the speech input.

15. The system of claim 14, wherein the audio quality score indicates a level of background noise present in the audio data.

16. The system of claim 11, wherein the operations further comprise, in response to detecting the presence of the keyword in the initial portion of the speech input, processing the audio data to determine a speaker-identification score for the speech input indicating a likelihood that the speech input matches a speaker profile associated with a user of the voice enabled device.

17. The system of claim 11, wherein the operations further comprise, in response to detecting the presence of the keyword in the initial portion of the speech input:

transcribing the speech input using a local ASR module residing on the voice enabled device, wherein instructing the voice enabled device to drop the speech input from being processed by the query processing stack comprises instructing the voice enabled device to drop the speech input from being processed by the query processing stack.

18. The system of claim 11, wherein the voice enabled device comprises a smart phone.

19. The system of claim 11, wherein the voice enabled device comprises a smart speaker.

20. The system of claim 11, wherein the voice enabled device comprises a tablet.

\* \* \* \* \*